United States Patent Office 3,536,437
Patented Oct. 27, 1970

3,536,437
ANTIMICROBIC FIBROUS MATERIALS AND FILMS, AND A METHOD OF PRODUCING THE SAME
Zakhar Alexandrovich Rogovin, Ulitsa Donskaya 60, kv. 102, and Alexandr Davidovich Virnik, Ulitsa Nagatinskaya 53, kv. 54, both of Moscow, U.S.S.R.
No Drawing. Filed Mar. 1, 1967, Ser. No. 619,611
Int. Cl. D06p 5/18
U.S. Cl. 8—17   7 Claims

ABSTRACT OF THE DISCLOSURE

An antimicrobic material produced by treating a dyed material with an acid, said dye being bonded to said dyed material by covalent bonds and containing an ionogenic group, followed by treatment with an ionic bactericide whereby a bond is formed between said dye and said bactericide.

---

The present invention relates to antimicrobic fibrous materials and films and methods of producing the same.

Fibrous materials and films possessing antimicrobic properties are of interest in a number of special fields. They find application in surgery for dressings and as packing materials for storing sterile surgical instruments, and can also be used for making gowns, garments, bed linens, covers, and curtains used in hospitals and bacteriological laboratories.

Antimicrobic properties can be imparted to fibrous materials and films by impregnation with solutions or emulsions of bactericides. In these instances, however, the bactericides are not fixed on the fibrous materials and films and are rapidly removed during use, particularly when laundered. It is therefore more expedient to join the bactericides to the macromolecules of the fibre-forming or film-forming polymers by chemical bonding (ionic, covalent or coordinate).

It is the object of the present invention to provide a method for producing antimicrobic fibrous materials and films whose antimicrobic properties are retained during lengthy use and repeated wet treatment.

The foregoing and additional objects have been accomplished by the provision of a method whereby fibrous materials or films, dyed with reactive dyes which during the dyeing operation form covalent bonds with the materials being dyed and which contain ionogenic groups, are treated with dilute acids and then with substances containing bactericidal cations which form bonds with the ionogenic groups of the dyes.

Due to the chemical bond between the ionogenic groups of the reactive dyes and the bactericides, fibrous materials and films retain their antimicrobic properties after numerous wet treatments. Suitable for treatment with bactericides are materials made from cellulose, polyvinyl alcohol, polyamides and other natural or synthetic polymers dyed with reactive dyes of the general formula A—B—C, wherein A is a reactive group which enters into chemical reaction with the material being dyed, B is a chromogen and C is an ionogenic group with which the bactericide is bonded.

For a better understanding of the invention by those skilled in the art, the following examples are given by way of illustration.

EXAMPLE 1

0.5 kg. of viscose staple fabric dyed with dye I,

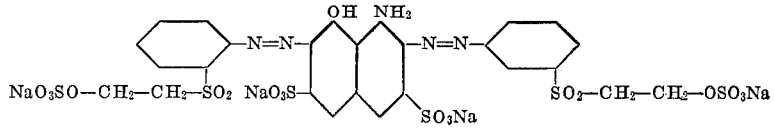

was treated with 10 liters of 0.1% hydrochloric acid at 20° C. for 30 min. and washed with distilled water to a neutral reaction. It was then treated for 30 min. at 20° C. with 10 liters of a solution containing $1.25 \times 10^6$ units of mycerine, an antibiotic from the group of neomycin, (base), washed with water and dried.

The antimicrobic activity of the fabric was tested by the "agar-plate" method, the test micro-organisms being *Bacillus subtilis* 6633, *B. mycoides* 537 and *Staphylococcus aureus* 209, in a concentration of 50–70 million microbes per ml. of agar. The zones of arrested growth of the micro-organisms round specimens of 1 $cm.^2$ were 8, 6 and 6 mm. respectively. The antimicrobic activity of the fabric was retained after laundering 20 times with soap or OII–10 detergent, a mixture of polyethyleneglycol esters of mono- and dialkyl phenols of the general formula

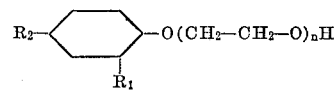

wherein $R_1$ is an alkyl containing, mainly, from 8 to 10 carbon atoms, $R_2 = R_1$ or H and $n = 10$–12, laundering conditions being as follows: temperature 50° C., time 30 min., bath factor 50:1, concentration of soap 5 g. per liter, concentration of OII–10 detergent 1 g. per liter. The zones of arrested growth of said micro-organisms after laundering with soap were 4, 1 and 1 mm. respectively, and after laundering with OII–10 detergent 5, 1 and 2 mm. respectively.

When 0.5 kg. of fabric was treated with a solution containing $2.5 \times 10^6$ units of mycerine, the zones of arrested growth of the said micro-organisms were 10, 8 and 6 mm. after laundering 20 times with soap the zones of arrested growth were 6, 2 and 3 mm., and after laundering with OII–10 detergent, 6, 3 and 4 mm.

EXAMPLE 2

1 kg. of cotton knitted fabric dyed with dye II,

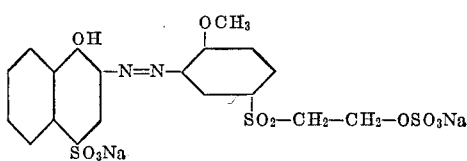

was treated for 30 min. with 10 liters of 0.1% hydrochloric acid at 20° C. and washed with distilled water to a neutral reaction. It was then treated with 10 liters of 0.1% silver acetate solution at 20° C. for 30 min., washed with water and dried.

The antimicrobic activity of the fabric was tested by the "agar-plate" method and by inoculating specimens of the fabric with a suspension of a 24-hour culture of *Staphylococcus aureus* or *Bacillus coli* containing $2 \times 10^9$ microbes per ml. The microbe suspension was applied to the specimen of fabric by the drip method at the rate of $1 \times 10^3$ microbes per $cm.^2$. The count of the surviving micro-organisms after a 45-minute exposure was made on solid nutrient medium in Petri dishes seeded with a suspension obtained by beating out the inoculated specimens with glass beads in physiological solution with stirring.

When the antimicrobic activity of the fabric was tested by the "agar-plate" method, the zones of arrested growth of the three micro-organisms specified in Example 1 were 4, 4 and 2 mm. respectively. When the antimicrobic activity of the fabric was tested by the second method, growth of bacteria was not detected. Death of the test microbes was 100%.

The antimicrobic properties of the fabric were fully retained after 5 launderings with soap or detergent OII–10. On the other hand, knitted fabric impregnated with a solution of silver acetate and air-dried lost practically all its antimicrobic activity after 5 launderings under the conditions stipulated above.

EXAMPLE 3

1 kg. of viscose staple fabric dyed with dye II, was treated with 10 liters of 0.1% hydrochloric acid at 20° C. for 30 min. and washed with distilled water to a neutral reaction. It was then treated with 20 liters of 0.2% copper acetate at 20° C. for 30 min. washed with water and dried. After a 45–min. exposure the reduction of bacterial seeding following inoculation by the drip method was 98% for *Staphylococcus aureus* and 97% for *Bacillus coli*. After 10 launderings with OII–10 detergent the reduction of bacterial seeding was 80% for both cultures. On the other hand, when fabric was impregnated with copper acetate solution and air-dried, it lost practically all its antimicrobic properties after one or two launderings.

EXAMPLE 4

10 g. of polyvinyl alcohol film dyed with dye I was treated with 200 ml. of 0.1% hydrochloric acid at 20° C. for 20 min. and washed with distilled water to a neutral reaction. It was then treated with 200 ml. of 0.2% N–cetylpyridinium chloride solution at 20° C. for 3 hr., washed with water and dried. Bacteriological tests showed that when a specimen of film was inoculated by the drip method, death of Staphylococcus after a 45-min. exposure was 100%.

EXAMPLE 5

100 g. of Kapron knitted fabric dyed with dye III,

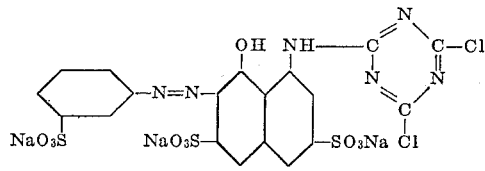

was treated for 20 min. with 500 ml. of 0.1% hydrochloric acid at 20° C. and washed with distilled water to a neutral reaction. It was then treated with 2 liter of 0.1% silver acetate solution at 20° C. for 60 min., washed with water and dried. Bacteriological tests showed that when a specimen of the fabric was inoculated with *Staphylococcus aureus* by the drip method, bacterial seeding of the specimen was reduced by 95% after a 45-min. exposure.

What is claimed is:

1. An antimicrobic material comprising a member selected from the group consisting of fibrous materials and films dyed with a reactive dye bonded to said dyed material by covalent bonds and containing an ionogenic group, said material being bonded to mycerine through said ionogenic group of said dye.

2. The antimicrobic material of claim 1 wherein said dye has the structural formula:

$$A—B—C$$

wherein A is a reactive group which enters into a chemical reaction with said material, B is a chromogen and C is said ionogenic group.

3. The antimicrobic material of claim 1 wherein said material is selected from the group consisting of cellulose and synthetic polymers.

4. A method of producing an antimicrobic material comprising treating a dyed material selected from the group consisting of fibrous materials and films, said dye being bonded to said material by covalent bonds and containing an ionogenic group, with an acid and with mycerine whereby a bond is formed between said mycerine and said ionogenic group.

5. The process of claim 4 including the step of dyeing said material.

6. The process of claim 4 wherein said dye has the structural formula:

$$A—B—C$$

wherein A is a reactive group which enters into a chemical reaction with said material, B is a chromogen and C is said ionogenic group.

7. The process of claim 4 wherein said material is selected from the group consisting of cellulose and synthetic polymers.

References Cited

UNITED STATES PATENTS

| 3,120,507 | 2/1964 | Andrew et al. | |
| 3,178,250 | 4/1965 | Ellis | 8—18 |
| 3,261,658 | 7/1966 | Feeman | 8—54.2 XR |

OTHER REFERENCES

Review of Textile Progress, 1960, pp. 354–355, published 1962 by The Textile Institute, Manchester England.

GEORGE F. LESMES, Primary Examiner

T. J. HERBERT, Jr., Assistant Examiner

U.S. Cl. X.R.

8—73